United States Patent

[11] 3,581,198

| [72] | Inventors | William E. Shoemaker<br>Los Altos;<br>David W. Wilson, Sunnyvale, both of, Calif. |
|---|---|---|
| [21] | Appl. No. | 789,721 |
| [22] | Filed | Jan. 8, 1969 |
| [45] | Patented | May 25, 1971 |
| [73] | Assignee | Signetics Corporation<br>Sunnyvale, Calif. |

[54] TESTING APPARATUS FOR ELECTRICAL DEVICE WHERE A STIMULUS IS VARIED BETWEEN TWO STATES
13 Claims, 6 Drawing Figs.

[52] U.S. Cl. .................................................. 324/73, 330/2
[51] Int. Cl. .................................................. G01r 15/12
[50] Field of Search .......................................... 324/73, 57; 330/2

[56] References Cited
FOREIGN PATENTS
950,455  2/1964  Great Britain ............... 324/73

Primary Examiner—Rudolph V. Rolinec
Assistant Examiner—R. J. Corcoran
Attorney—Flehr, Hohbach, Test, Albritton & Herbert ABSTRACT: Testing apparatus for testing electrical devices such as operational amplifiers which sequences through a series of tests each test having first and second test halves during which a parameter of the device is varied between two states. The apparatus can be used for pass-fail testing of electrical devices or alternatively for sorting by selective display of the quantitative test information for any desired parameter. This is accomplished by providing a pushbutton for each test; by depressing the pushbutton associated with the test the quantitative information is displayed.

TESTS VS PROGRAMMED VALUES

| TEST | TEST PERIOD HALF | RESISTANCES | | | | | VOLTAGES | | | | OUTPUT VOLTAGE |
|---|---|---|---|---|---|---|---|---|---|---|---|
| | | R5 | R6 | R8 | R9 | +P.S. | −P.S. | $V_{CM}$ | $V_R$ | |
| +PSS | 1ST | $R_S$ | $R_S$ | — | $\frac{R_{LL} \times R7}{R_{LL} - R7}$ | V+ | V− | 0 | 0 | $V_{O2} = k_2(+PSS)$ |
| | 2ND | $R_S$ | $R_S$ | — | | $(1\pm\Delta)$V+ | V− | 0 | 0 | |
| −PSS | 1ST | $R_S$ | $R_S$ | — | | V+ | V− | 0 | 0 | $V_{O2} = k_2(-PSS)$ |
| | 2ND | $R_S$ | $R_S$ | — | | V+ | $(1\pm\Delta)$V− | 0 | 0 | |
| CMR | 1ST | $R_S$ | $R_S$ | — | | V+ | V− | $-CMV_{MAX}$ | 0 | $V_{O2} = \frac{k_3}{CMR}$ |
| | 2ND | $R_S$ | $R_S$ | — | | V+ | V− | $+CMV_{MAX}$ | 0 | |
| $I_B$ | 1ST | $R_I$ | 0 | — | | V+ | V− | 0 | 0 | $V_{O2} = k_4 I_B$ |
| | 2ND | 0 | $R_I$ | — | | V+ | V− | 0 | 0 | |
| $I_O$ | 1ST | $R_I$ | $R_I$ | — | | V+ | V− | 0 | 0 | $V_{O2} = \frac{k_4}{2} I_O$ |
| | 2ND | 0 | 0 | — | | V+ | V− | 0 | 0 | |
| $G_{LL}$ | 1ST | 0 | 0 | $\frac{+18V}{+V_{OLL}} R7$ | | V+ | V− | 0 | −18V | $V_{O2} = \frac{k_5}{G_{LL}}$ |
| | 2ND | 0 | 0 | $\frac{-18V}{-V_{OLL}} R7$ | | V+ | V− | 0 | +18V | |
| $G_{HL}$ | 1ST | 0 | 0 | $\frac{+18V}{+V_{OHL}} R7$ | $\frac{R_{HL} \times R7}{R_{HL} - R7}$ | V+ | V− | 0 | −18V | $V_{O2} = \frac{k_6}{G_{HL}}$ |
| | 2ND | 0 | 0 | $\frac{-18V}{-V_{OHL}} R7$ | → | V+ | V− | 0 | +18V | |

TESTING APPARATUS FOR ELECTRICAL DEVICE WHERE A STIMULUS IS VARIED BETWEEN TWO STATES

BACKGROUND OF THE INVENTION

The present invention is directed to testing apparatus for electrical devices devices and more particularly to operational amplifiers. Present testing apparatus for operational amplifiers and other electrical devices is elaborate, expensive and specialized in function. In the testing operational amplifiers, different types of tests are required for differing circumstances First for incoming testing, that is coming into the plant to be used in production, it is necessary to have what is known as pass-fail testing where each component is quickly tested on the basis of either being above or below certain predetermined parameters or values. This type of testing must be automatic in nature and fast because of the large number of components involved. On the other hand where engineering or quality control for example wishes to evaluate a particular component or alternatively sort components to provide a more restricted range of characteristics than that originally specified, the testing apparatus should also be adaptable for this function.

In addition the testing apparatus should have the resolution, speed, and accuracy required for the sorting and evaluation functions which are of a much higher magnitude than the incoming pass-fail type testing. The testing apparatus should also have a flexibility in its mode of operation between a completely automatic processing incoming components to the other extreme of operation on a step-by-step basis by engineering or quality control personnel.

Present testing apparatus of the above type does not have the needed flexibility for different types of tests and is too highly specialized for the particular task.

OBJECTS AND SUMMARY OF THE INVENTION

It is therefore a general object of the present invention to provide improved testing apparatus.

It is another object of the invention to provide testing apparatus of the above type which may be used both for rapid production of incoming testing and sorting and evaluation type testing with equal facility.

It is another object of the invention to provide apparatus as above which is simple and inexpensive and still provides for high resolution, speed, and accuracy in testing.

It is another object of the invention to provide a testing apparatus as above in which several tests may be sequentially conducted automatically with no data display or alternatively test data for a single test may be displayed.

In accordance with the above objects there is provided a testing apparatus for testing an electrical device having at least one input and an output. The testing apparatus comprises a first high gain amplifier having an input coupled to the output of the device and an output. Feedback means are coupled from the output of the first amplifier to the device input. A second high gain amplifier is provided which also has both an input and an output. Feedback means are coupled from the output of the second amplifier to the input of the device. Means are provided for varying a stimulus to the device between two states. Switching means having open and closed conditions couple the output of the first amplifier to the input of the second amplifier in response to one of the above states of the stimulus and decouples the second amplifier from the first amplifier in response to the other of the states.

From another aspect the testing apparatus of the present invention can be used for testing an electrical device with a plurality of tests. The apparatus comprises a plurality of pushbuttons, each associated with one of the plurality of tests. Sequencer means sequentially vary the parameter of the amplifier between two different states for each of the plurality of tests and also cause the tests to be sequentially made. Counter means are provided. Means for receiving quantitative test data from each of the tests and placing such data in the counter means are provided. The receiving means also includes means for normalizing the test data to a single standard. Means are coupled to the counter for detecting the most significant bit for providing a pass-fail indication for each test. Visual display means for reading out the quantitative value of any test in the counter are actuated in response to the depression of the pushbutton associated with that particular test.

DETAILED DESCRIPTION OF INVENTION

Figure 1A:
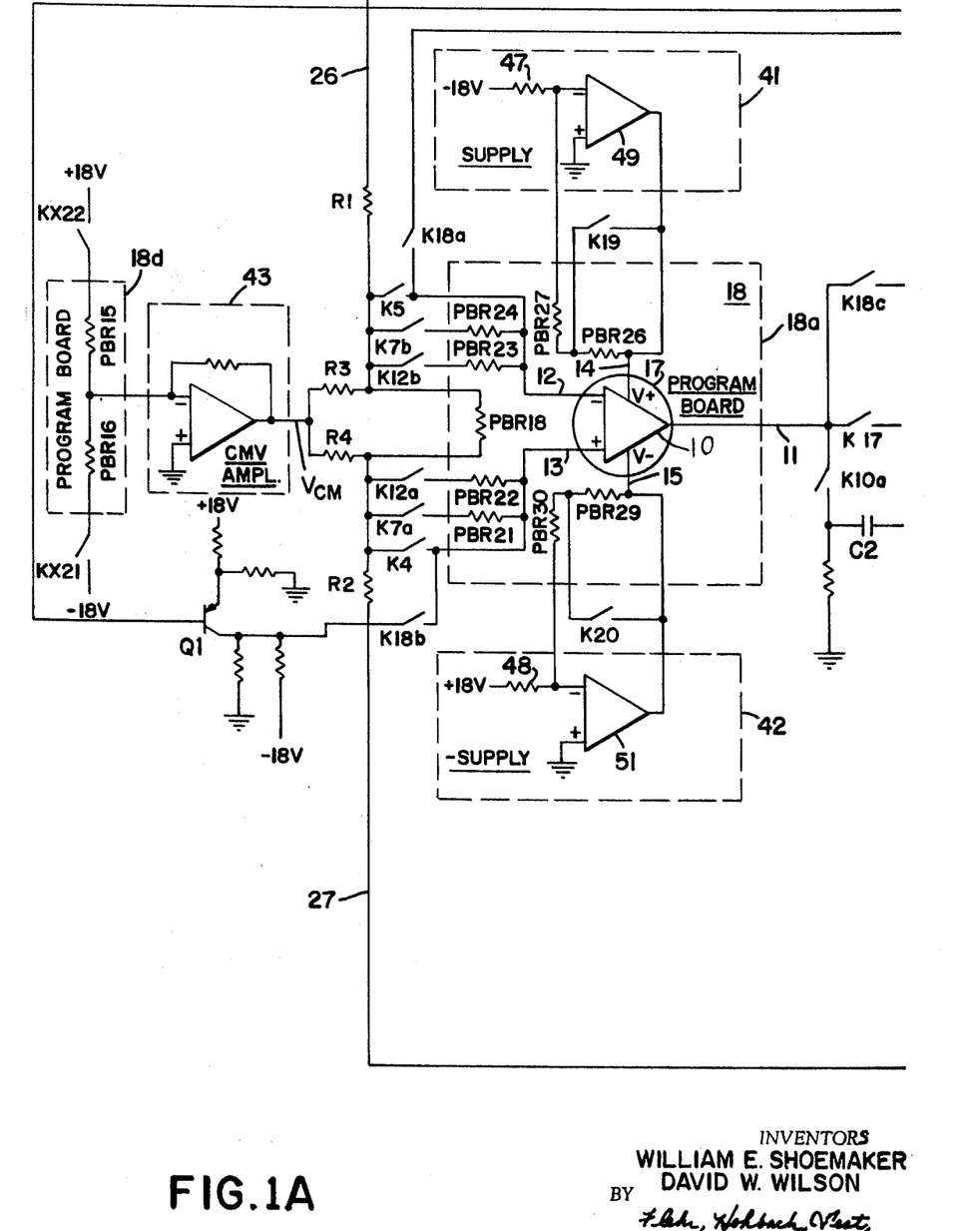
FIGS. 1A and 1B are a schematic circuit diagram of testing apparatus embodying the present invention.

Referring first to FIG. 1A there is illustrated a device under test 10 which is an operational amplifier having an output 11, an inverting input 12, a noninverting input 13 and positive and negative power supply voltage inputs 14 and 15. The device under test 10 is mounted in a socket 17 which is affixed to a program board 18 which has been selected for the particular device under test. In the testing apparatus of the present invention the characteristics which are to be tested of each device and the test parameters to be used are determined by the particular program board 18. Thus in testing a particular operational amplifier, the device is placed in the socket 17 of a program board chosen to have the desired testing characteristics and the program board as a whole is then inserted into a suitable receptacle in the remainder of the testing apparatus.

Program board 18 actually is shown in FIG. 1 in several sections, the section containing the device under test 10 and socket 17 being designated 18a The manner in which the program board can be modified to adjust for different test requirements will be discussed below.

Each program board portion is shown by the appropriate dashed block.

The program board establishes reference voltages, parameter limits, and a special parameter grouping for final pass or fail indication. Each resistor on the program board is designated with the prefix PBR.

Figure 1B:
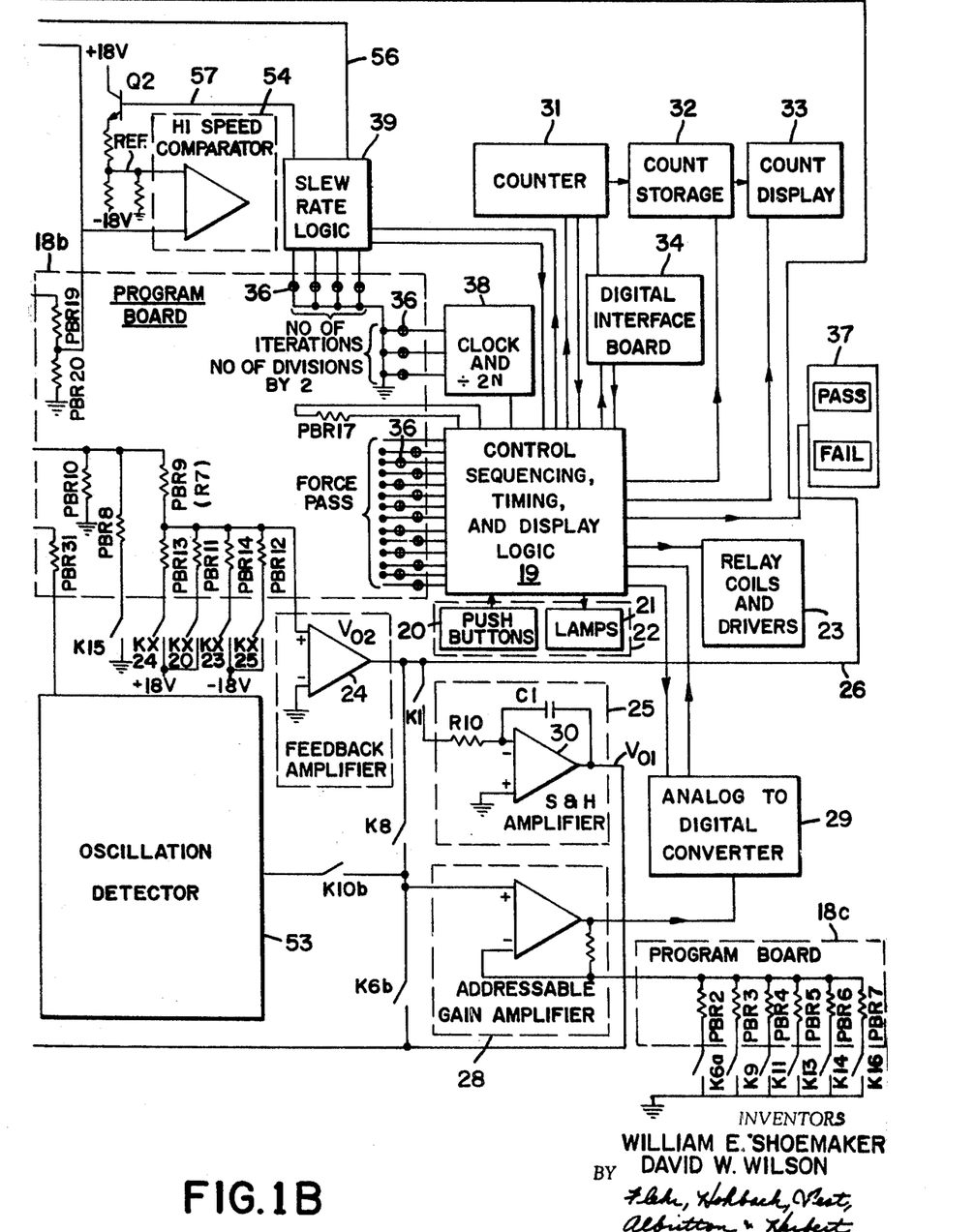

Referring now to other major blocks of the circuit of FIGS. 1A and 1B, the control logic for the overall test apparatus is indicated by block 19 designated "Control, Sequencing, Timing, and Display Logic". Coupled to logic unit 19 are test pushbuttons 20 and lamps 21 which provide illumination for the individual pushbuttons. Each pushbutton 20 is associated with or corresponds to a particular test which the testing apparatus is programmed to conduct. Pushbuttons are placed on the front panel of the device indicated generally by the dashed block 22 and when any one button is pressed, the testing apparatus will sequence through the entire programmed list of tests as determined by the program board with each pushbutton being lit by an associated lamp 21 as that test is being done.

As will be discussed in greater detail below, logic unit 19 controls the sequencing of the testing apparatus. The majority of tests have a first test period half and a second test period half and the tests themselves automatically sequence one after the other. Such sequencing is in practice provided by the block 23 labeled "Relay Coils and Drivers" which are associated with all of the switches of FIGS. 1A and 1B.

The output 11 of the device 10 is coupled to the input of a high gain feedback amplifier 24 through a series connected switch K17 and a resistor PBR 9 on program board portion 18b. The negative terminal of amplifier 24 is coupled to a common terminal or ground. The output of high gain feedback amplifier 24 is designated $V_{02}$ and is coupled back to the input 12 of device 10 on a line 26. The output voltage $V_{02}$ is also coupled to a high gain sample and hold amplifier 25 which includes an amplifying section 30, feedback capacitor C1, and an input resistor R10. Capacitor C1 causes amplifier 30 to hold its output voltage when the input is disconnected by the opening of switch K1. The output voltage $V_{02}$ from feedback amplifier 24 is coupled to the negative input terminal of amplifier 25 through a series connected sample and hold switch K1 and resistor R10. The positive terminal of the amplifier is coupled to common or ground. The output of sample and hold amplifier 25 is designated $V_{01}$ and this voltage is coupled or fed back to the input terminal of the device under test 10 on line 27.

Both the $V_{02}$ and $V_{01}$ outputs of feedback amplifier 24 and sample and hold amplifier 25 respectively are coupled to an addressable or variable gain amplifier 28. Feedback amplifier output voltage $V_{02}$ is coupled to the input of addressable gain amplifier 28 through series connected switch K8. Sample and hold amplifier 25 has its output voltage $V_{01}$ coupled through relay K6b to the input of amplifier 28. The gain of addressable gain amplifier 28 is controlled by a program board portion 18c containing program board resistors PBR 2 through PBR 7 which are respectively placed in the circuit by switches K6a, K9, K11, K13, K14 and K16. These switches couple the individual resistors between the negative input of the addressable gain amplifier 28 and ground. Thus the gain of the amplifier 28 is determined by the switches of program board portion 18c. The output of amplifier 28 is coupled to analog to digital converter 29 which is coupled to control logic 19.

Digital information from converter 29 is processed by logic unit 19 into a counter unit 31. The accumulated count in counter 31 is stored on command in a count storage unit 32 and displayed on command in count display unit 33. Count display unit 33 is in practice a line of Nixie-type tubes which are also placed on the front panel of the testing apparatus. The detailed functioning of the counter, count display and logic unit 19 will be explained in conjunction with FIG. 4.

A digital interface board 34 provides digital communication between the logic unit 19 and optional external devices such as automatic handling equipment and/or data logging equipment. In this mode of operation all quantitative test data would be recorded by the data logger. Such a data logger would normally be in computer format. Coupled to logic unit 19 from program board portion 18b are several lines designated "Force Pass". Each Force Pass line except one includes a drill-out designated 36 which is a plated through hole on the printed program board which can be drilled out to break that particular connection. When any one of the Force Pass lines, each of which is associated with a particular test, is drilled out this will break the continuity of the line to the logic device 19 and cause the logic to "pass" on that particular associated test as far as a pass-fail indication is concerned. This is provided by a pass-fail indicator 37 coupled to logic unit 19 which provides either a pass indication or a fail indication in accordance with certain predetermined parameters of the device under test 10. Thus the Force Pass lines are used to eliminate those tests which are not guaranteed by the original manufacturer of the device as meeting a certain specification. However, the test itself is still conducted and may be data logged or read out in count display 33 if desired. Other sections of program board 18b also contain drill-outs 36 and as indicated provide for variation in the number of divisions of two that are made by a block circuit 38 coupled to logic unit 19 and the number of iterations conducted by a slew rate logic unit 39 also coupled to logic unit 19.

Coupled to socket 17 and the device under test 10 on program board portion 18a are several inputs including the feedback voltages on lines 26 and 27 respectively from feedback amplifier 24 and sample and hold amplifier 25, positive and negative voltages from power supplies 41 and 42 designated by the dashed blocks and a common mode voltage from amplifier 43. Coupled to with the negative input of the common mode voltage amplifier 43 is a program board portion 18d which includes resistors PBR 15 and PBR 16 which may be selected by switches KX 22 and KX 21, respectively. Switch KX 21 is terminated at a negative 18 volts and KX 22 at a positive 18 volts. PBR 15 or 16 is selected to establish a predetermined common mode voltage $V_{CM}$ at the output of the amplifier 43. This voltage is coupled to the input terminals 12 and 13 of the device under test 10 through connected resistors R3 and R4, which are coupled together by resistor PBR 18 on program board portion 18a, and through respective switches or relays K5 and K4. When a test does not utilize common mode voltage, $V_{CM}$ is nominally 0. It is forced to zero by switches KX 21 and 22 being opened. This is the condition that will exist for most tests.

Feedback line 26 from feedback amplifier 24 is coupled to input 12 of device 10 through a resistor R1 and either switch K5, or series connected switch K7b and PBR 24 or series connected switch K12b and PBR 23. Feedback line 27 from sample and hold amplifier 25 is coupled through a series connected resistor R2 to input 13 either through switch K4, series connected switch K7a and PBR 21 or series connected switch K12a and PBR 22.

Figure 2:
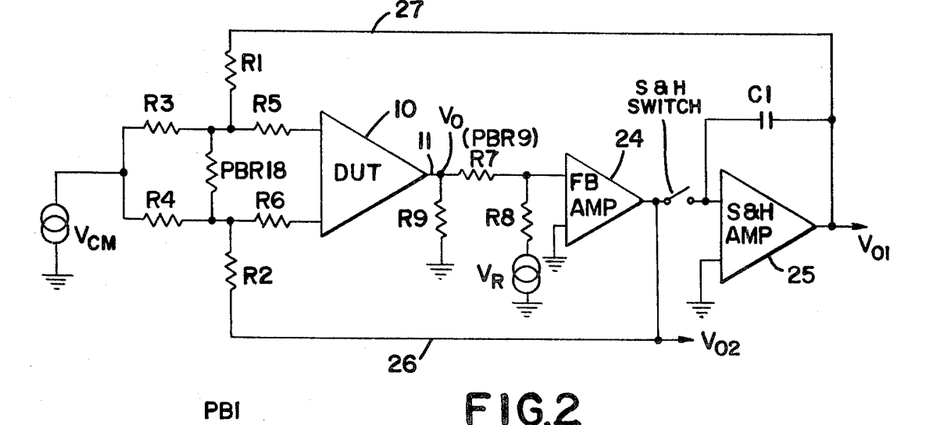
FIG. 2 is a simplified circuit schematic of a portion of FIGS. 1A and 1B.

FIG. 2 is a simplified schematic of the portion of the testing circuit including device under test 10, feedback amplifier 24, and sample and hold amplifier 25. In addition common mode voltage amplifier 43 is represented as a voltage source $V_{CM}$. Output line 11 on the device under test 10 is coupled to the input of feedback amplifier 24 through a program board resistor PBR 9 (designated also R7) which referring to FIG. 1B is on portion 18b of the program board. Different voltages are impressed on this input line by means of resistor R8 and a voltage source $V_R$. Referring to FIG. 1B resistor R8 corresponds to program board resistors PBR 11 through 14. These resistors are selectively coupled to positive and negative 18 volt sources through relays or switches KX 23 through KX 26. These switches are normally open for all tests except for those concerning voltage gain of the device under test 10.

To illustrate the operation of the present invention an example of a voltage gain test will be given. Such a test is illustrated more graphically in FIG. 3 where $G_{LL}$ is for gain test under light load and $G_{HL}$ a gain test under heavy load. As indicated each test period is divided into a first and a second half. Values of the resistances R5, R6, R8 and R9 are given along with the positive and negative power supply voltages, the common mode voltage $V_{CM}$, and $V_R$. Referring now specifically to the gain light load, $G_{LL}$, test, resistors R5 and R6 are of zero value. This is accomplished referring to FIG. 1A with the closures of relays K4 and K5 to provide a direct connection to the inputs 12 and 13 of the device under test. The common mode voltage $V_{CM}$ is set at zero by the opening of switches KX 21 and KX 22. Resistor R8 for the first half of the test cycle has the value as indicated on the table of FIG. 3 in which $V_O$ is the actual output of device 10. $V_R$ is −18 volts for the first half of the test period and +18 volts for the second half. In the light load gain test this is accomplished by actuation of switches KX 23 and KX 24 which thereby select resistors PBR 13 and 14. Resistor R8 has been selected to produce a certain predetermined voltage output $V_O$, for example 9 volts, on output 11 of the device 10. This value of $V_O$ is determined by manufacturer's specifications of the device's output voltage swing. Thus, with $V_O$ at 9 volts and $V_R$ at the 18 volt value, R8 is exactly twice the value of R7. Resistor R9 has a value determined by $R_{LL}$ which is the parallel combination of resistors PBR 10 and R7 (PBR 9).

Figure 3:
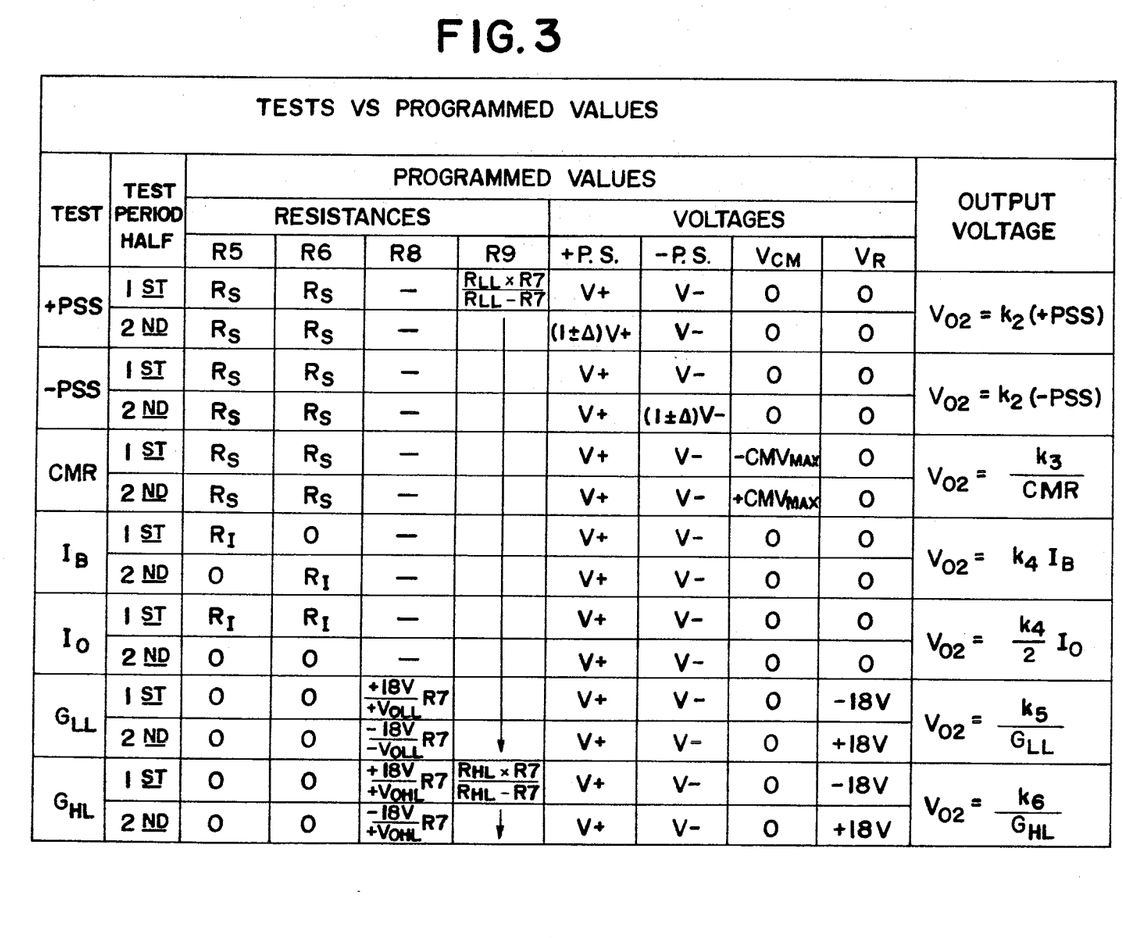
FIG. 3 is a table useful in understanding the circuit of FIG. 2 and the various tests performed by the testing apparatus of the present invention.

Initially the test conditions during the first half of the test period therefore would place the voltage source $V_R$ at a negative 18 volts. To counteract this voltage the output voltage $V_O$ of device 10 must have an opposite value of for example a positive 9 volts since R8 has a value exactly twice that of R7. Thus this would produce a 0 voltage to the feedback amplifier. Also during this test period phase sample and hold switch K1 is closed. With the sample and hold switch closed, the negative feedback on line 27 from the output of sample and hold amplifier 25 combined with the very high gain of amplifier 25 requires the input to amplifier 25 to be very close to 0. The feedback on line 26 is also very close to 0. Thus, the feedback on line 27 from sample and hold amplifier 25 must be of a value which offsets the characteristic input offset voltage of the device under test 10. In other words it must be a value which produces the desired positive 9 volts for $V_O$.

In the second step of the measurement procedure or the second test half, sample and hold switch K1 is opened causing the same amount of feedback to remain from the high gain amplifier 25 via loop 27 in view of the holding capacitor C1. At the same time the sample and hold switch K1 was opened loop however, as shown in the table FIG. 3, voltage $V_R$ was reversed to a positive 18 volts. Thus the output $V_O$ of the device 10 must now swing to a negative 9 volts to produce the required 0 voltage input to feedback amplifier 24. Since amplifier 24 has a gain approaching infinity, as is also true of amplifier 25, the negative feedback on line 26 requires a substantially 0 voltage input. The output of the feedback amplifier on line 26 must now be for example a positive 4.5 volts to make the proper change occur in the device under test 10. The gain of the device under test would be 18 volts, the difference between +9 and −9, divided by the 4.5 volt output $V_{o2}$, of feedback amplifier 24 divided by 100. The 100 is an attenuation factor produced by resistors R1 through R4 and PBR 18 which attenuate the feedback on line 26. Thus, in this particular case the gain of the device 10 would be 400.

In summary, in essence what is done on every test is first a certain condition is established for feedback amplifier 24 and sample and hold amplifier 25 with the sample and hold switch closed. Because of the large gain in both amplifiers and because of the negative feedback circuit configuration the output of the feedback amplifier is forced to zero when the sample and hold switch K1 is closed. When the sample and hold switch is open and the stimulus of interest is changed to its other state, the output of the feedback amplifier changes in proportion to the parameter which is being measured. Thus in the first half of the test period the sample and hold amplifier takes out all of the inaccuracies associated with the device under test by forcing the output of feedback amplifier to be 0.

As shown in the table of FIG. 3 the output voltage, $V_{o2}$, of the feedback amplifier 24 is related to the gain under light load, $G_{LL}$, by a factor $k_5$. This factor, as is obvious from the above example, is determined by the swing of voltage $V_o$ and the attenuation factor.

With the $G_{HL}$ or heavy load gain test different resistors are inserted in the circuit by the program board portion 18b. Specifically, resistors PBR 11 and 12 and resistor PBR 8 which is placed in the circuit by the closure of switch K15.

A third test listed on the table of FIG. 3 as "CMR" is for common mode rejection. In this test again referring to FIGS. 1A, 1B, 2 and 3 the $V_{CM}$ voltage source is switched between a positive 18 volts and a negative 18 volts by alternate closure of switches KX 21 and KX 22. This provides a change in state of the applied common mode voltage of the test circuit which is a stimulus to the circuit. Resistors R5 and R6 are placed at a value designated $R_S$. Where no appreciable source impedance $R_S$ is desired the switches K4 and K5 are closed (FIG. 1) which creates a direct connection through to input 12 and input 13 of the device under test 10. Where source impedance is desired then switches K7a and K7b are closed. Here the source impedance is provided by PBR 21 and PBR 24 which are typically of a value of 10 kilohms. Source impedance is used for common mode rejection tests since most manufacturers specify a source impedance associated with the common mode rejection. As indicated on the table of FIG. 3 the output voltage $V_{o2}$ of the feedback amplifier when the sample and hold switch K1 is open is equal to the common mode rejection ratio which is volts per volt and the factor $k_3$ which is dependent on the specific values of the resistors. As is apparent, this is similar in concept to the gain test.

The first two tests shown on the table of FIG. 3 are for both positive and negative power supply sensitivity. Power supplies 41 and 42 which are positive and negative, respectively, supply a specified voltage to the device which are typically a positive and negative 18 volts. Each power supply includes high gain amplifiers 49 and 51 with negative feedback paths comprising PBR 26 and 27 for amplifier 49 and PBR 29 and 30 for amplifier 51. The inverting inputs to the amplifier are always close to ground because of the high gain. Each inverting input has coupled to it an 18 volt source in series with resistors 47 and 48. The polarity of the voltage sources determines the ultimate polarity of the power supply. The output of amplifier 49 is $$\frac{\text{PBR } 26 + \text{PBR } 27}{\text{Resistor } 47} \times 18 \text{ v.}$$

when K19 is open. When switch K19 is closed, PBR 26 is eliminated from the above relationship to thus change the output to a lower value. The output of amplifier 51 is similarly determined. Power supply sensitivity is measured after closure of switches K19 or K20 depending on whether a positive or negative test is being made.

As indicated in the table of FIG. 3 the power supply sensitivity is therefore proportional to the measured output voltage $V_{o2}$ of the feedback amplifier 24. The plus and minus power supply voltage variation as indicated in the +PS and −PS columns is of course achieved by closure of switches K19 and K20.

The remaining tests shown in the table of FIG. 3 are the $I_B$ or bias current and $I_o$ or offset current tests. The stimulus varied here in the case of bias current are resistors R5 and R6. Switches K12a and K12b are actuated to selectively place PBR 22 and PBR 23 in series with the inputs 13 and 12 of device 10. These resistors of course correspond to the resistors R6 and R5 of FIG. 2.

As indicated by the table of FIG. 3 in the bias current test, resistor R5 in the first half of the test period is designated $R_I$ which indicates that PBR 22 is present in the circuit and R6 is currently zero. In the second half of the test period this situation is reversed to thus provide an output voltage on $V_{o2}$ which along with the constant $k4$ provides for a bias current test data. In the case of offset current both resistors, indicated $R_T$, are in series with the plus and minus inputs of the device under test in the first half of the test period and in the second half they are shorted out. Thus with sample and hold switch K1 closed, $V_{o2}$ is 0 and when open during the second half of the cycle $V_{o2}$ is at a value which in combination with a constant $k4$ as in the $I_B$ test but divided by two provides offset current test data.

Although the present invention finds special application in the testing of operational amplifiers, it is also suitable for use in the testing of any electrical devices which have an input and output and a parameter which may be measured. The two feedback paths provided are necessarily a negative feedback to provide a stable circuit arrangement in which the output for example of feedback amplifier 24 is forced to 0 when the sample and hold switch K1 is closed. The phase of the feedback voltage on line 27 is opposite to that on line 26 as illustrated in FIGS. 1A and 1B. This opposite polarity is automatically compensated for by the inverting input of an operational test amplifier. Therefore when the present invention is used with other types of electrical devices not having an inverting input an external inverter would be used for example in line 26 with a summing network to couple into the single input on the electrical device.

The addressable gain amplifier 28 provides for six different gains on actuation of the appropriate switch by logic unit 19. All of the values of $V_{o2}$ for the different tests may be normalized to a single standard and this standard digitized by an analog to digital converter 19 and coupled to the logic unit 19. Comparison of all test results to a single standard determines whether the pass or fail light of indicator 37 is illuminated. Comparison with a single standard allows the counter to be programmed so that when it reads 100 it will be at the edge of the parameter limit that has been established. Since the 100 percent value is the borderline between a pass and fail, the count display consisting of Nixie tubes will read out from 0 percent to plus or minus 199 percent. Values from 0 to 99 percent indicate a pass and from 100 to 199 percent a fail. This allows for a greater than 100 percent value where for example the device under test greatly exceeds its maximum specification.

Other tests which are provided for in the testing apparatus of the present invention include an oscillation detection test in which relay $K10a$ is closed to couple the output of the device 10 through a capacitor C2 through PBR 31 to an oscillation detector 53. The oscillation detector 53 includes a differential amplifier with rectifying diodes in its feedback loop to charge capacitors up to the peak of the AC voltage that appears at the output of the device 10 on line 11. The DC voltage on the capacitors detected by the oscillation detector is therefore a measure of the amount of oscillation involved in the device under test and this is coupled through relay $K10b$ to addressable gain amplifier 28. High DC values of course indicate oscillation in the device and low DC values little oscillation.

Another test is termed a slew rate test for response time of the device 10. This is performed by a slew rate logic unit 39 which is coupled to a high speed comparator 54. One input of the comparator is a reference voltage switchable between two different levels. The other input to the comparator extends from the output of device 10 on line 11 through relay $K18c$ through PBR 19. This input to the comparator is coupled to the input 12 of device 10 through relay $K18a$ which provides a feedback path to keep the device 10 out of saturation. Slew rate logic unit is coupled to program board portion $18b$ where four drill-outs 36 may be used to determine the number of iterations that the slew rate device makes. Details of the slew rate device is disclosed and claimed in a copending application "Response Time Measurement Device" with the same inventors as the present application and assigned to the same assignee.

Driving voltage for the device 10 for the purpose of a slew rate measurement is provided on a line 56 which extends from slew rate logic 39 to the base of a transistor Q1. The emitter of Q1 is placed at a positive 18 volts which will result in a voltage of approximately 3 volts being coupled into the input 13 of the device under test when transistor Q1 is in a conductive condition. With transistor Q1 open the −18 volts with associated resistors provides a negative 3 volts to the input 13. In response to the ±3 volt swing on input 13 the junction between PBR 19 and 20 will move toward either a positive 3 volts or a negative 3 volts. However, it will never reach the 3 volt limit because of the lower reference voltage on the negative input terminal to the high speed comparator. A square wave reference voltage is provided by transistor Q2 and the associated resistors and indicated voltage sources. A feedback line 57 from slew rate logic 39 provides the proper timing so that the reference voltage moves in a square wave fashion. More specifically, as soon as the comparison of 2 volts is reached on the high speed comparator, the logic reverses the reference voltage thereby causing the device under test to move toward the opposite polarity. By detecting the time between switching intervals for positive and negative polarities the slew rate or response time of the device may thereby be detected as is more fully disclosed in the above mentioned copending application.

Figure 4:
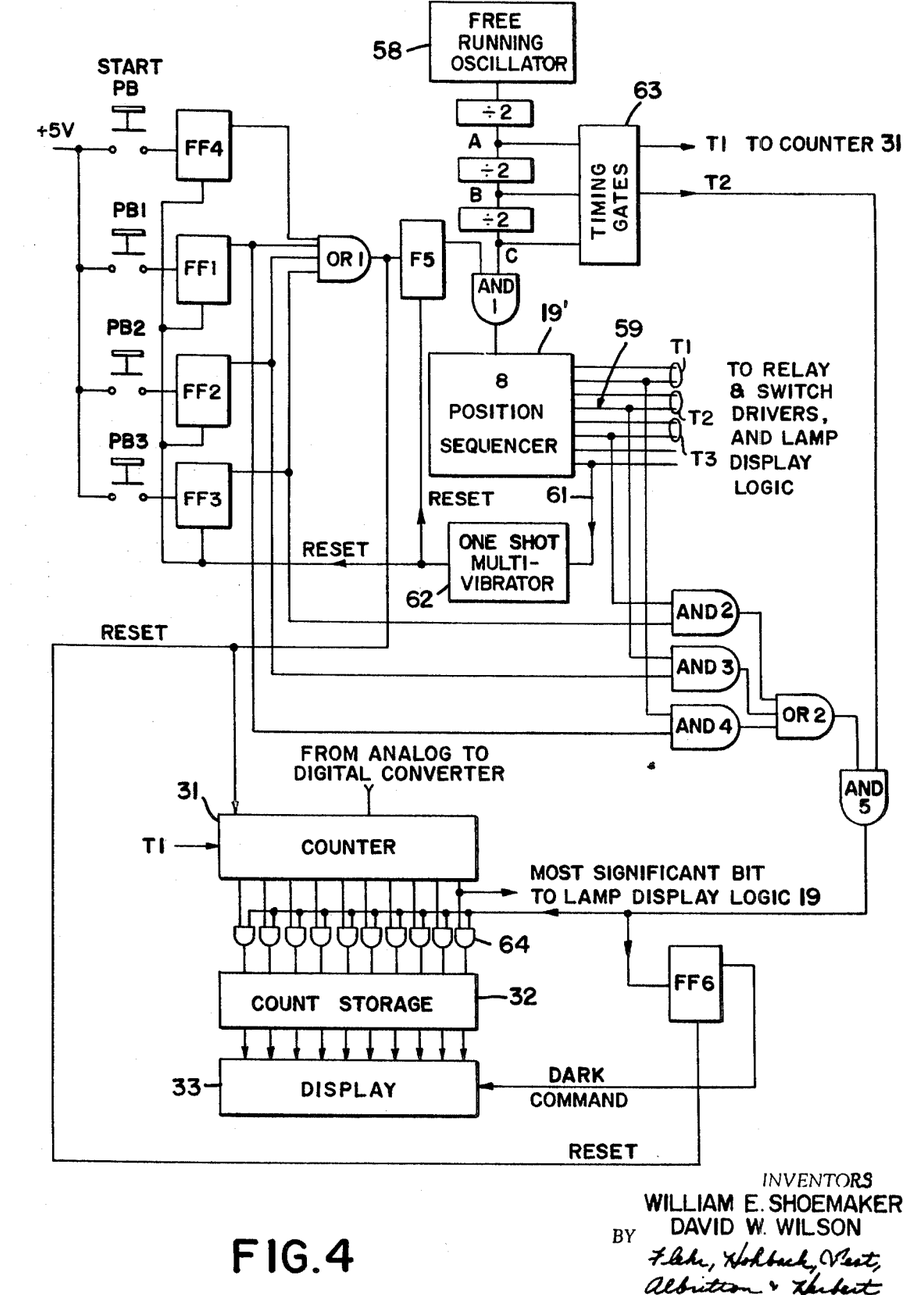
FIG. 4 is a block diagram of a portion of FIGS. 1A and 1B showing some elements of the invention in greater detail to emphasize another aspect of the invention.
Figure 5:
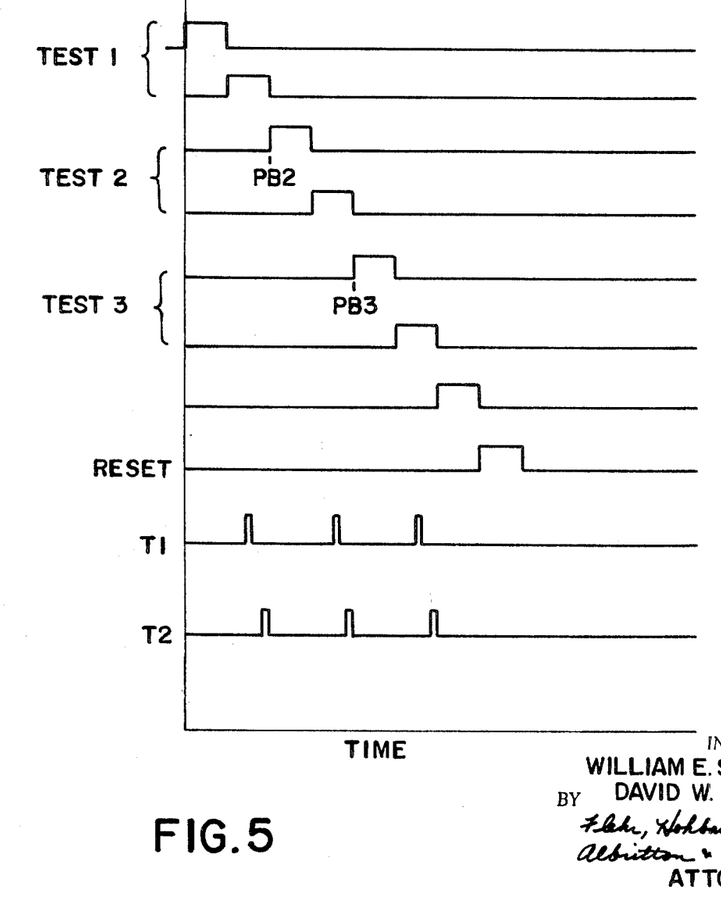
FIG. 5 is a timing diagram useful in understanding the block diagram of FIG. 4.

Referring now to FIG. 4, the several tests as outlined above are done in sequence as determined by logic unit 19 and pushbuttons 20. Representative pushbuttons are shown in FIG. 4 labeled PB 1, PB 2, PB 3 and a start pushbutton. In actuality there are as many pushbuttons as tests and in addition the start button; the number of pushbuttons represented in FIG. 4 is representative only. Coupled to each pushbutton is a similarly numbered flip-flop unit. Each flip-flop has its output coupled to to an OR gate 1 which in turn has its output coupled to a flip-flop 5. Operation of any single pushbutton, therefore, will actuate its corresponding flip-flop and through OR gate 1 operate flip-flop 5. The output of flip-flop 5 is anded through AND gate 1 with the divided output of a free running oscillator 58 which is divided 3 times by 2 or one-eighth of the frequency of the free running oscillator. The output of AND gate 1 is coupled to a position sequencer 19' which is a part of the logic unit 19 as illustrated in FIG. 1B which sequentially places an activating or positive voltage on the output lines 59. Each pair of output lines is associated with one test indicated and the similarly numbered pushbutton. The line pairs are coupled to the appropriate relay and switch drivers and lamp display logic. As mentioned above each test has a first test period half and a second test period half. Thus, the sequencer varies in each test period the stimulus to the device under test to two different states by successively placing an activating voltage on each individual line of a test line pair and then sequentially makes all of the tests. The eighth line has an output 61111111 coupled 68 a one-shot multivibrator 62 which 26 provides a reset voltage for flip-flops 1 through 5. A timing gate 63 is coupled to the various divider networks coupled to free running oscillator 58 to provide timing pulses T1 and T2 which are illustrated in FIG. 5. These will be discussed in conjunction with the operation of FIG. 4.

The second line of the pair of output lines 59 for each test 1, 2, 3 is coupled into AND gates 2, 3, and 4, respectively. The other inputs to these AND gates extend from the outputs of flip-flops 1, 2 and 3, respectively. AND gates 2 through 4 have their outputs in turn coupled into an OR gate 2 which has its output coupled into an AND gate 5. The other input to AND gate 5 are timing pulse T2 from timing gate 63. The output of AND gate 5 is coupled into ten AND gates 64 which also receive the digital output levels from counter 31. Coincidence of both inputs to AND gate 64 provides an output to count storage unit 32 whose outputs are coupled to display unit 33. Counter 31 also has an input timing pulses T1 from timing gate 63 and an input from analog to digital converter 29 to provide a count of the digital information resulting from the quantitative data being measured. AND gate 5 has its output also coupled to a flip-flop 6 which has an output labeled Dark Command to eliminate any display on unit 33. Both flip-flop 6 and counter 31 are reset by a reset line from the output of OR gate 1. The 10 line digital output of counter 31 has its most significant bit coupled to logic unit 19 where this bit is examined to determine the pass-fail test and thereby control illumination of pass-fail lights 37 (FIG. 1B). Because of the normalizing effect of the addressable gain amplifier, if there is a one bit as the most significant bit the device under test is failed and if there is a 0 bit it passes since the criteria of the addressable gain amplifier 28 as programmed by program board portion $18c$ is that 0 to 99 percent constitutes a pass and 100 to 199 percent a failure.

Referring now to the operation of the circuit of FIG. 4, if either the start pushbutton or any other test pushbutton is pressed, a test sequence will be started and flip-flop 5 will be actuated to initiate the action of the position sequencer 19'. If the start pushbutton was pressed, then AND gates 2, 3 and 4 will never provide an output and thus no information will be provided to count storage 32 through AND gate 64. This would be the normal incoming inspection where only a pass-fail indication would be desired. This indication comes from the most significant bit of counter 31.

Assuming, however, that the test data for test 1 is desired to be displayed then the operator would press pushbutton 1 which would initiate the entire test sequence. When the position sequencer reaches the line coupled to AND gate 2 a coincidence input is present from flip-flop 1 and the AND gate would be open providing an output for OR gate 2 and also opening AND gate 5 upon coincidence of a timing pulse T2. This is illustrated in FIG. 5 where for test 1 pushbutton 1 is indicated with the positive relay activating pulses during the first test period half and the second test period half. In the latter portion of the second test period half, pulse T2 coincides with this second test period half to provide an output on AND gate 5. This closes AND gates 64 and transfers the counter information to the count storage 32 which then is automatically displayed on display unit 33.

Still referring to the timing diagram of FIG. 5, the pulse T1 coupled to counter 31 determines the time period during which information can enter counter 31 from analog to digital converter 29. T1 occurs just prior to T2. Flip-flop 6 provides a dark command to display unit 33 after one of the pushbuttons has been depressed until the time that count storage 32 has information transferred to it. At this time the output of AND gate 5, in addition to opening AND gate 64, also sets flip-flop 6 to eliminate the dark command from display unit 33 allowing the contents of count storage 32 to be displayed. Flip-flop 6 is reset along with counter 31 by the reset line which extends from the output of OR gate 1. Thus the reset of counter 31 and flip-flop 6 occurs upon initiation of the next test sequence.

Thus, in summary, the sequencer in combination with associated gates provides for the counter 31 receiving quantitative test data from analog to digital converter 29 and placing such data in counter 31. By detecting the most significant digit at counter 31 a pass-fail indication is provided for each test. If it is desired to read out data for any particular test, the pushbutton related to that test is depressed causing the counter information to be transferred to count storage 32 and then to display unit 33.

Thus the present invention provides an improved testing apparatus which can accommodate several levels of testing such as pass-fail and sorting and evaluation. For example, sorting is accomplished by depressing any particular pushbutton for which data is desired and this may be done manually for each electrical device to be tested. For automatic pass-fail testing all tests can be run without interruption or display of any quantitative information. The accuracy of the quantitative measurement is also enhanced by the unique circuitry used to obtain information as to any parameter.

We claim:

1. Testing apparatus for testing an electrical device having at least one input and an output said apparatus comprising a first high gain amplifier having an input coupled to said output of said device and an output, first negative feedback means for coupling said output of said first amplifier to said input of said device, a second high gain amplifier having an input and an output, second negative feedback means for coupling said output of said second amplifier to said input of said device, means for varying a stimulus to said device between two states, and switching means having open and closed conditions for coupling said output of said first amplifier to said input of said second amplifier during the first one of said states of said stimulus and decoupling said second amplifier from said first amplifier during the second of said states.

2. Testing apparatus as in claim 1 in which said second amplifier includes means for holding its output when its input is disconnected by said switch opening.

3. Testing apparatus as in claim 1 together with display means coupled to the output of said first amplifier when said second amplifier is decoupled, the magnitude of the signal on such output being proportional to the test data desired.

4. Testing apparatus as in claim 1 in which said device has two inputs and the stimulus being varied is the common mode voltage being applied to said two inputs, said voltage in one state being a positive value and in another state a negative value said output of said first amplifier being proportional to the common mode rejection characteristic of said device when said second amplifier is decoupled.

5. Testing apparatus as in claim 1 in which said first and second feedback means varies the magnitude of output signal of said device to maintain a substantially zero input voltage to said first amplifier during both states of said stimulus.

6. Testing apparatus as in claim 1 together with variable voltage supply means coupled to said output of said device and in which the stimulus being varied is the signal magnitude of said variable voltage supply means, such voltage supply means coupling a voltage of one polarity to said device output when said switch closed and a voltage of an opposite polarity when said switch is open, the signal magnitude of the output of said device being adjusted by said first and second feedback means to provide a substantially zero input voltage to said first amplifier during both states of said stimulus.

7. Testing apparatus for testing an electrical device comprising: sequencer means for subjecting said device to a plurality of sequential tests by sequentially varying a stimulus to said device between a first state and a second later state for each of said tests; a plurality of manually operable switch elements each corresponding to one of said tests; logic means coupling said switch elements to said sequencer means and responsive to actuation of any one of said switch elements for initiating operation of said sequencer means to sequentially vary said stimulus and sequence through said plurality of tests; means coupled to said device for providing a digitized test result voltage which is generated in response to said stimulus being placed in said second state; counter means for receiving said digitized test voltage; means coupled to said counter means for comparing its contents with a reference standard at a predetermined time and providing a qualitative, pass-fail, visual indication of said test results; means for quantitatively displaying the contents of said counter means; and logic means coupled to said switch elements for coupling said quantitative display means to said counter means and for transferring the contents of said counter means to such display only for a test associated with one of said switch elements which has been actuated such actuation enabling said transfer function of said logic means.

8. Apparatus as in claim 7 together with an additional manually operable switching element coupled only to said sequencer means for initiating operation of said sequencer means.

9. Apparatus as in claim 7 where said pass-fail indication means is responsive to the most significant bit of the contents of said counter means to provide such indication.

10. Apparatus as in claim 7 where said means for providing a digitized test result voltage includes a variable gain amplifier for normalizing said test results to a single standard.

11. Apparatus as in claim 10 where said means for providing a digitized test result voltage also includes a removable printed circuit program board having resistors thereon which establish stimulus level and gain levels for said variable gain amplifier.

12. Apparatus as in claim 11 where said board also includes a socket for the device being tested.

13. Apparatus as in claim 11 where said board includes printed circuit drill-outs for inhibiting said pass-fail indication.